(12) United States Patent
Kohmoto et al.

(10) Patent No.: US 8,748,023 B2
(45) Date of Patent: Jun. 10, 2014

(54) ELECTRONIC APPARATUS AND BATTERY PACK

(71) Applicant: Kabushiki Kaisha Toshiba, Tokyo (JP)

(72) Inventors: Yoshinori Kohmoto, Oume (JP); Takeshi Iwata, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/669,300

(22) Filed: Nov. 5, 2012

(65) Prior Publication Data

US 2013/0059186 A1    Mar. 7, 2013

Related U.S. Application Data

(63) Continuation of application No. 12/898,348, filed on Oct. 5, 2010, now abandoned.

(30) Foreign Application Priority Data

Jan. 29, 2010    (JP) .................................. 2010-019684

(51) Int. Cl.
*H01M 2/00*    (2006.01)
*H01M 2/04*    (2006.01)

(52) U.S. Cl.
USPC .............................................. 429/97; 429/99

(58) Field of Classification Search
USPC ...................................................... 429/97, 99
See application file for complete search history.

(56) References Cited

U.S. PATENT DOCUMENTS

| | | | |
|---|---|---|---|
| 5,212,020 A | 5/1993 | Inobe | |
| 5,248,927 A | 9/1993 | Takei et al. | |
| 5,415,947 A | 5/1995 | Mitsui et al. | |
| 7,141,330 B2 | 11/2006 | Aoyama | |
| 7,642,005 B2 * | 1/2010 | Han | ............................ 429/99 X |
| 2001/0046624 A1 | 11/2001 | Goto et al. | |
| 2006/0210866 A1 | 9/2006 | Horii et al. | |
| 2009/0169982 A1 | 7/2009 | Goto | |
| 2011/0189519 A1 | 8/2011 | Kohmoto et al. | |

FOREIGN PATENT DOCUMENTS

| | | |
|---|---|---|
| JP | UM-45-017619 | 7/1970 |
| JP | 62-123064 | 8/1987 |
| JP | 04-144056 | 5/1992 |

(Continued)

OTHER PUBLICATIONS

Japanese Patent Application No. 2010-019684; Notice of Reasons for Rejection; Mailed Jan. 18, 2011 (English translation).

(Continued)

*Primary Examiner* — Kwang Han
(74) *Attorney, Agent, or Firm* — Blakely, Sokoloff, Taylor & Zafman LLP

(57) ABSTRACT

An electronic apparatus comprises a battery pack that comprising a first battery cell and a second battery cell that are arranged in a first direction and store energy for enabling operation of electronic components; and a battery holder that houses the battery pack. The battery holder comprises a projecting part in a first face that configures the battery holder and covers the battery pack while the battery pack is provided with a slit that is fitted with the projecting part in a second face that is opposed to the first face. Furthermore, the first direction intersects a boundary direction extending between the first battery cell and the second battery cell, and the slit is formed to extend along the first direction in the second face.

16 Claims, 8 Drawing Sheets

(56) References Cited

FOREIGN PATENT DOCUMENTS

| | | |
|---|---|---|
| JP | 11-354089 | 12/1999 |
| JP | 2001-111254 | 4/2001 |
| JP | 2004-192970 | 7/2004 |
| JP | 2004-213987 | 7/2004 |
| JP | 2005-042494 | 2/2005 |
| JP | 2005-275123 | 10/2005 |
| JP | 2006-260255 | 9/2006 |
| JP | 2009-163292 | 7/2009 |

OTHER PUBLICATIONS

Japanese Patent Application No. 2010-019684; Notice of Reasons for Rejection; Mailed Mar. 29, 2011 (English translation).

U.S. Appl. No. 12/898,348; Non Final Office Action; Mailed Feb. 21, 2012.

U.S. Appl. No. 12/898,348; Final Office Action; Mailed Aug. 3, 2012.

* cited by examiner

ELECTRONIC APPARATUS AND BATTERY PACK

CROSS-REFERENCE TO THE RELATED APPLICATION(S)

This application is a continuation application that is based upon and claims priority to U.S. application Ser. No. 12/898,348, now abandoned, which is based upon and claims priority from prior Japanese Patent Application No. 2010-019684, filed on Jan. 29, 2010, the entire contents of which are incorporated herein by reference.

FIELD

Embodiments described herein generally relate to a battery pack and an electronic apparatus which houses a battery pack.

BACKGROUND

In recent years, it has become a common procedure for a user to carry a portable information terminal such as a notebook personal computer. On the other hand, it has been proposed to install a TV receiver in a wall-hung manner rather than a stationary manner. Such electronic apparatus are strongly required by users to be reduced in size, weight, or thickness. However, to reduce the size, weight, or thickness of an electronic apparatus, the strength of the case of the electronic apparatus should be increased.

For example, JP-A-2005-275123 discloses an electronic apparatus having a display panel in which the display panel is reinforced and held by holding members in which lightweight, first to third reinforcement structures (beams) are formed at a low cost by pressing.

Another document, JP-A-2006-260255, discloses an electronic apparatus in which a case of a battery unit has a thin portion that is thinner than its battery cell housing portion. The battery unit is disposed in such a manner that the thin portion and a pointing device are arranged in the thickness direction of the electronic apparatus so as to overlap with each other.

However, JP-A-2005-275123 only intends to increase the productivity by decreasing the number of working steps for producing the holding members and to reinforce the display panel with the holding members. No consideration is given to influence of interference between the projected faces of the reinforcement beams and other members.

To reduce the thickness of the electronic apparatus, JP-A-2006-206255 merely employs the structure that the case of the battery unit is made thin in the thickness direction of the electronic apparatus in the region where the battery unit overlaps with the pointing device. Therefore, no consideration is given to increasing the strength of the thickness-reduced portion of the case of the electronic apparatus main body.

That is, conventionally, an electronic apparatus may be difficult to be made thinner while the strength of the case of the electronic apparatus main body is increased.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

Figure 1:
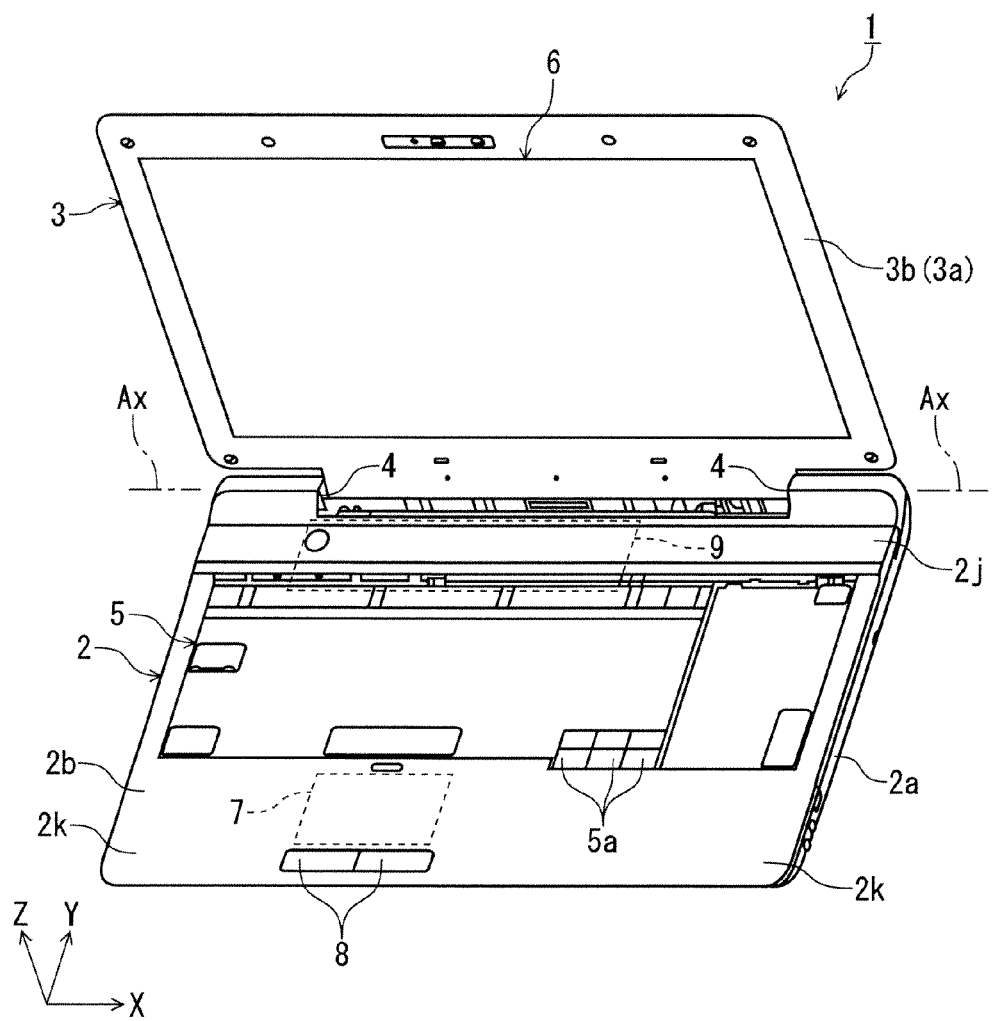
FIG. 1 is a perspective view of a notebook personal computer (PC) (electronic apparatus) according to an embodiment of the present invention.

According to the embodiments described herein, there is provided an electronic apparatus including: an electronic component; a battery pack configured to supply power to the electronic component; and a battery holder configured to receive the battery pack, wherein a first face of the battery holder opposing to a second face of an outside wall of the battery pack is formed to comprise a beam, and wherein the second face of the battery pack is formed to include a slit that is fitted with the beam.

Embodiments according to the present invention will be described in detail with reference to the accompanying drawings. The scope of the claimed invention should not be limited to the examples illustrated in the drawings and those described in below.

FIG. 1 is a perspective view of a notebook personal computer (PC) 1 (electronic apparatus) according to the embodiment of the invention.

As shown in FIG. 1, the notebook PC 1 according to the embodiment is composed of a main unit 2 which is provided with a keyboard 5 etc. and a display unit 3 which is provided with a display panel 6 etc. The display unit 3 is attached to the main body 2 so as to be opened and closed.

The following directions are defined in this description for a state that the notebook PC 1 is in use. The X direction is defined as the width direction of the main unit 2 (right-left direction), the Y direction is defined as the depth direction of the main unit 2 as viewed from the user (front-rear direction), and the Z direction is defined as the thickness direction of the main unit 2 (top-bottom direction). The X, Y, and Z directions are perpendicular to each other. In each of the following drawings of components, directions written therein indicate how the components are oriented in the notebook PC 1. In the following description, the front side and the rear side are defined as the user's side and the deep side, respectively, in the depth direction (Y direction). The top side and the bottom side are defined as the front face side and the back face side in the thickness direction (Z direction).

Although the embodiment is directed to the notebook PC 1 as an example electronic apparatus according the invention, the invention may also be applied to other electronic apparatus such as a portable mobile terminal device and a cell phone.

The main unit 2 has a rectangular, thin case 2a and the display unit 3 has a rectangular, thin case 3a. The cases 2a and 3a may be made of a metal material, a synthetic resin material, or the like.

A keyboard 5, a pointing device 7, and click buttons 8 (manipulation input units), and other components are provided in the main unit 2 so as to be exposed in a front face 2b (outer face) of the case 2a. Only keys 5a which are part of the keys of the keyboard 5 are shown in FIG. 1. The case 2a has a ceiling wall 2j and a palm rest 2k on the rear side and the front side, respectively.

The main unit 2 is provided with a battery holder 9 for housing a battery pack 10 which is a component (module) to be described later in detail with reference to FIG. 3. The battery pack 10 is housed in the battery holder 9 by inserting the former from below. The battery holder 9 is disposed under the ceiling wall 2j. Alternatively, the battery holder 9 may be disposed under the palm rest 2k.

The main unit 2 is an apparatus main body which is equipped with such electronic components as an HDD, a main board, a wireless communication module, etc. (none of them are shown).

The display unit 3 is equipped with the display panel (a display device having a display screen) 6 such as an LCD (liquid crystal display) panel as an electronic component in such a manner that it is exposed in a face (outer face) 3b of the case 3a.

Hinge mechanisms 4 connect end portions of the main unit 2 and an end portion of the display unit 3 so that they can rotate with respect to each other. The hinge mechanisms 4 allow the main unit 2 and the display unit 3 to rotate with respect to each other about a rotation axis Ax between an open state and a closed state. FIG. 1 shows the open state. In the open state, the keyboard 5, the display panel 6, etc. are exposed and the user can use them. In the closed state, the faces 2b and 3b are close to and opposed to each other and the keyboard 5, the display panel 6, etc. are hidden by the cases 2a and 3a.

Plural electronic components provided in the main unit 2 and the display unit 3 operate being supplied with power from the battery pack 10 which is housed in the battery holder 9.

Figure 2:
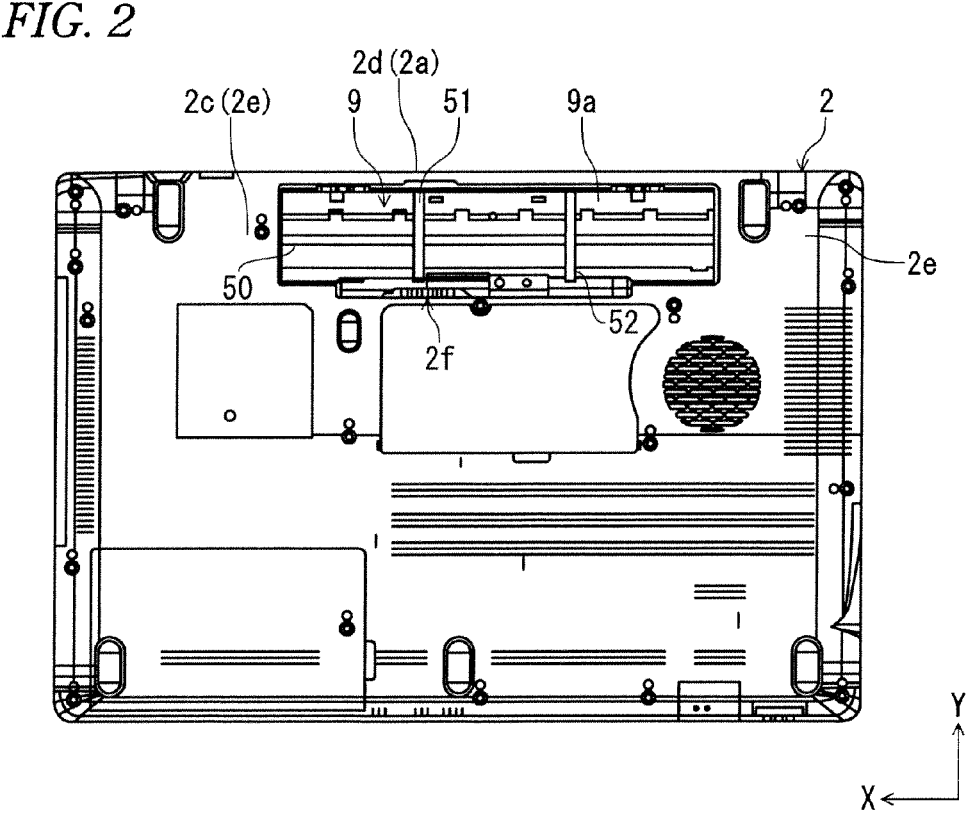
FIG. 2 is a bottom plan view of a main unit of the notebook PC.

Next, the structure of a bottom face 2e of the main unit 2 of the notebook PC 1 will be described with reference to FIG. 2. FIG. 2 is a bottom plan view of the main unit 2 of the notebook PC 1.

The bottom face 2e (outer face) of the case 2a of the main unit 2 is formed with the battery holder 9 for housing the battery pack 10 at a rear end position that is close to a rear face 2d of a rear side wall (part of the circumferential wall) of the case 2a. The battery holder 9 has a long and narrow, generally rectangular-parallelepiped-shaped space extending in the X direction parallel with the rear face 2d. The battery holder 9 is a concave recess formed in a bottom wall 2c which has the bottom face 2e.

Figure 3:
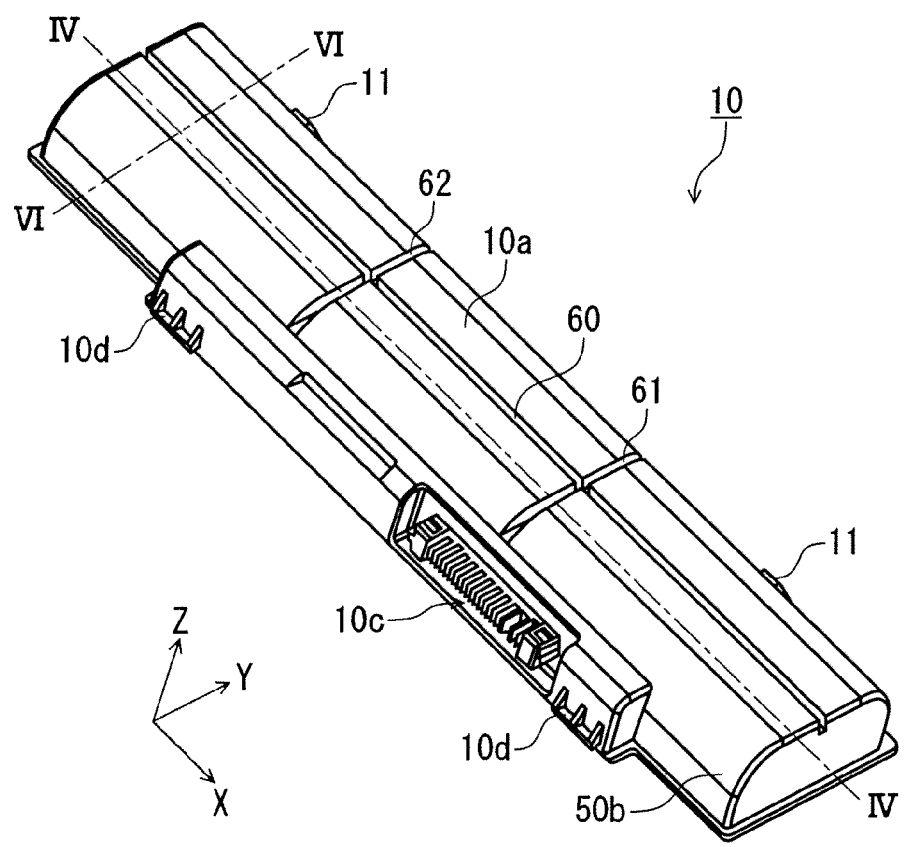
FIG. 3 is a top perspective view of a battery pack.

The battery pack 10, which will be described later in detail with reference to FIG. 3, is housed in the battery holder 9. The battery holder 9 is provided with a connector 2f having terminals to be electrically connected to the battery pack 10 housed in the battery holder 9. In the state that the battery pack 10 is housed in the battery holder 9, a bottom face 10b of the battery pack 10 and the bottom face 2e form a continuous surface. That is, the bottom face 10b of the battery pack 10 serves as a lid of the battery holder 9.

An XY cross section, a YZ cross section, and a ZX cross section of the battery holder 9 conform to a corresponding XY cross section, YZ cross section, and ZX cross section of the battery pack 10, respectively. In the embodiment, a top wall 9a of the battery holder 9 (part of the case 2a) is formed with a beam 50 extending in the X direction and beams 51 and 52 extending in the Y direction. The beams 50-52 project downward from the outer face of the top wall 9a. The top wall 9a is shaped so as to conform to the confronting outer face of the battery pack 10 in the state that the battery pack 10 is housed in the battery holder 9. The top wall 9a which is part of the case 2a is increased in strength (reinforced) by the beams 50-52.

Next, the outward form of the battery pack 10 will be described with reference to FIG. 3. FIG. 3 is atop perspective view of the battery pack 10.

The battery pack 10 is a component that stores electric energy for enabling operation of the plural electronic components provided in the main unit 2 and the display unit 3. The battery pack 10 is equipped with battery cells (batteries) which function as power sources.

The battery pack 10 is provided with a connector 10c having terminals for supplying power from the battery pack 10 to the electronic components etc. of the notebook PC 1. The terminals of the connector 10c are also used for charging up the batteries of the battery pack 10. In the state that the battery pack 10 is housed in the battery holder 9, the terminals of the connector 10c are electrically connected to those of the connector 2f of the battery holder 9.

Nails 10d to be engaged with the case 2a are formed on the bottom-front edge of the battery pack 10, and the rear face of the battery pack 10 is formed with ribs 11. The state that the battery pack 10 is housed in the battery holder 9 is maintained by the nails 10d and the ribs 11.

The battery pack 10 is generally shaped like a long and narrow, rectangular parallelepiped extending in the X direction. The bottom face 10b of the battery pack 10 is generally flat, and the bottom face 10b and the bottom face 2e of the case 2a form a continuous surface in the state that the battery pack 10 is housed in the battery holder 9. A YZ cross section of the top face 10a of the battery pack 10 projects upward and has an inverted-U shape based, in part, on a curvature of a portion 50b of top surface 10a. To conform to this shape, a corresponding YZ cross section of the top wall 9a of the battery holder 9 also has an inverted-U shape.

The top face 10a (a face of the outside wall) of the battery pack 10 is formed with a slit 60 extending in the X direction and slits 61 and 62 extending in the Y direction. The slits 60-62 are grooves which are recessed downward from the top face 10a. In the state that the battery pack 10 is housed in the battery holder 9, the slits 60-62 are fitted with the respective beams 50-52 of the top wall 9a, opposed to the top face 10a, of the battery holder 9. This structure can minimize the gap in the Z direction between the battery holder 9 and the battery pack 10 in the state that the battery pack 10 is housed in the battery holder 9.

The battery pack 10 incorporates the plural battery cells (batteries) for storing electric energy. Details will be described with reference to FIGS. 4-6 and 8.

The internal structure of the battery pack 10 will be described with reference to FIGS. 4 and 5. Each of FIGS. 4 and 5 is a sectional view, taken along line IV-IV in FIG. 3, of part of the battery pack 10 (line IV-IV is drawn so as not to coincide with the slit 60).

Figure 4:
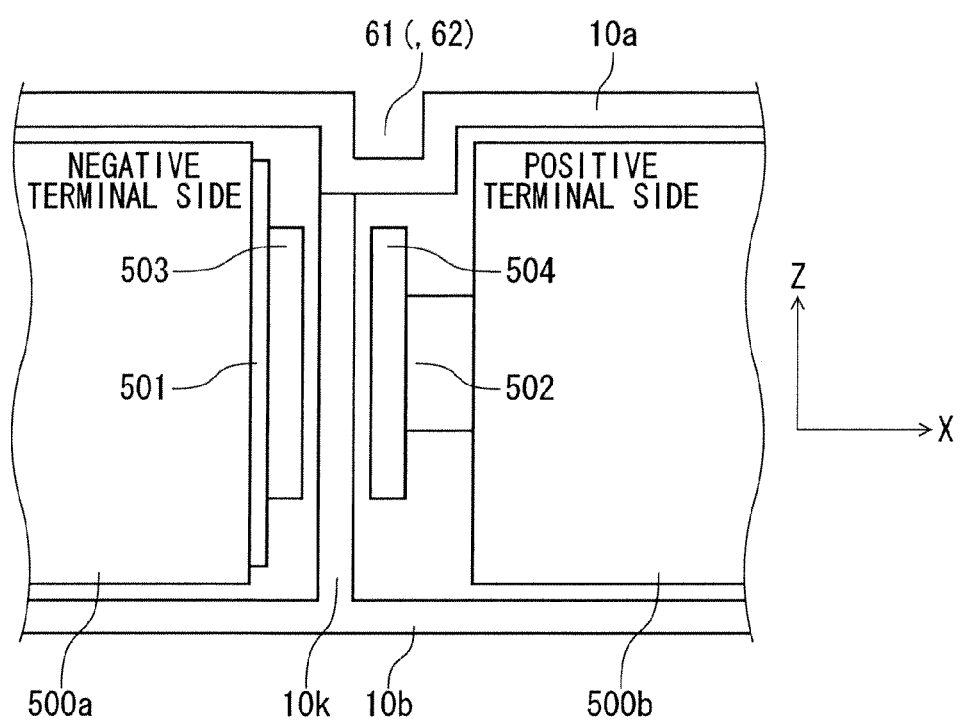
FIG. 4 is a partial sectional view, taken along line IV-IV in FIG. 3, of part of the battery pack, wherein the line IV-IV is line drawn so as not to coincide with a slit extending in the X direction.
Figure 5:
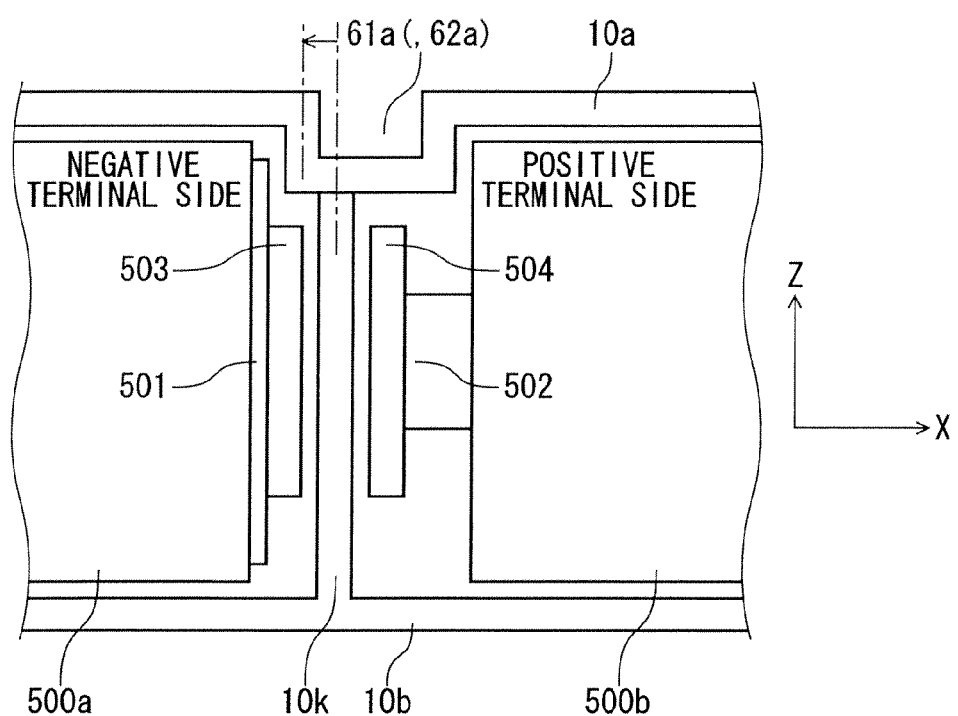
FIG. 5 is a sectional view, taken along line IV-IV in FIG. 3, of part of the battery pack.

As shown in FIG. 4, the top face 10a of the battery pack 10 is formed with the slits 61 and 62. A partition wall 10k is erected from the bottom face 10b of the battery pack 10 toward the bottom wall of the slit 61. The partition wall 10k is a member for partitioning the space where battery cells 500a and 500b are placed. It is obligatory to partition the space where the battery cells 500a and 500b are placed in constructing the battery pack 10. In the embodiment, the battery cells 500a and 500b are cylindrical cells. The battery cells 500a and 500b are thus disposed on both sides of the partition wall 10k.

The negative terminal side of the battery cell 500a is disposed on the left of the partition wall 10k and has a negative terminal 501. The negative terminal 501 is in contact with a negative electrode 503 which is one of electrodes for electrical connections between the plural battery cells incorporated in the battery pack 10.

The positive terminal side of the battery cell 500b is disposed on the right of the partition wall 10k and has a positive terminal 502. The positive terminal 502 is in contact with a positive electrode 504 which is one of the electrodes for electrical connections between the plural battery cells incorporated in the battery pack 10.

The negative electrode 503 and the positive electrode 504 are electrically connected to each other inside the battery pack 10. No limitations are imposed on the manner of connection.

The positional relationship between the partition wall 10k and the slit 61 depends on whether the positive terminal side of one of the associated battery cells is located on the right or left of the partition wall 10k. In the sectional view of FIG. 4, the positive terminal 502 of the battery cell 500b is located on the right of the partition wall 10k. In this case, since a space for accommodating the positive terminal 502 of the battery cell 500b needs to be formed under the slit 61, the partition wall 10k is disposed under the left wall of the slit 61.

The left wall of the slit 61 need not always be disposed right over the partition wall 10k. For example, as shown in FIG. 5, a slit 61a (or slit 62a) may be formed which is wider in the X direction than the slit 61 (or slit 62a). In this case, the left wall of the slit 61a is disposed on the left (on the battery cell 500a side) of the upper extending line of the partition wall 10k.

With the configuration described in the above, each of the slits 61 and 62 is formed in the space that is formed when the associated battery cells are arranged adjacent to each other in the longitudinal direction of the battery pack 10. That is, each of the slits 61 and 62 is disposed so as to avoid interference with the associated battery cells. As a result, the thickness of the battery pack 10 in the Z direction is not increased by the formation of the slits 61 and 62 and depends on only the diameter of the battery cells as in the case of conventional battery packs.

Figure 6:
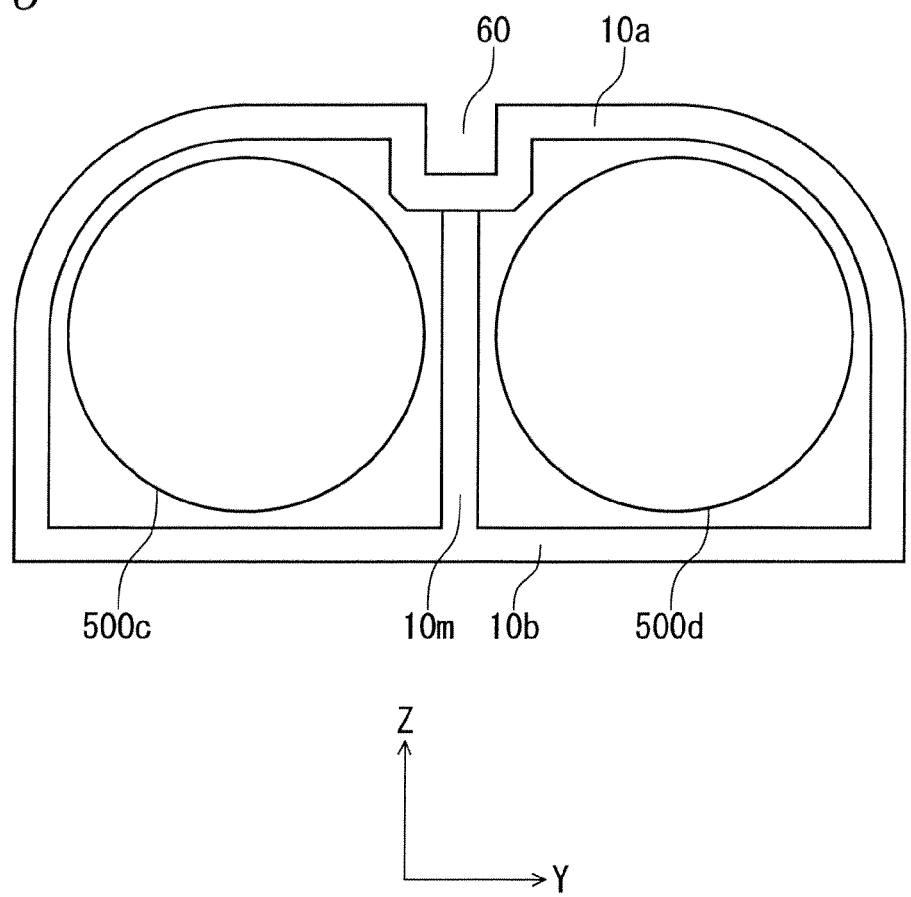
FIG. 6 is a sectional view, taken along line VI-VI in FIG. 3, of part of the battery pack, wherein the line VI-VI is a line drawn so as not to coincide with either of slits extending in the Y direction.

The internal structure of the battery pack 10 will continue to be described with reference to FIG. 6. FIG. 6 is a sectional view, taken along line VI-VI in FIG. 3, of part of the battery pack 10 (line VI-VI is drawn so as not to coincide with either of the slits 61 and 62 extending in the Y direction).

As shown in FIG. 6, the top face 10a of the battery pack 10 is formed with the slit 60. A partition wall 10m is erected from the bottom face 10b of the battery pack 10 toward the bottom wall of the slit 60. The partition wall 10m is a member for partitioning the space where battery cells 500c and 500d are placed. It is obligatory to partition the space where the battery cells 500c and 500d are placed in constructing the battery pack 10. In the embodiment, the battery cells 500c and 500d are cylindrical cells. The battery cells 500c and 500d are thus disposed on both sides of the partition wall 10m.

As for the positional relationship between the partition wall 10m and the slit 60, the partition wall 10m is disposed so as to intersect the bottom wall of the slit 60 approximately at the center, in the Y direction, of the slit 60. It is therefore preferable that the slit 60 be formed so as to be symmetrical with respect to the center line, extending in the Z direction, of the partition wall 10m. However, the positional relationship between the partition wall 10m and the slit 60 may not be limited to the above one.

With the above structure, the slit 60 is formed in the space that is formed when the associated battery cells are arranged adjacent to each other in the shorter-axis direction of the battery pack 10. That is, the slit 60 is disposed so as to avoid interference with the associated battery cells. As a result, the thickness of the battery pack 10 in the Z direction is not increased by the formation of the slit 60 and depends on only the diameter of the battery cells as in the case of conventional battery packs.

Next, how the battery pack 10 is housed in the battery holder 9 will be described in detail with reference to FIG. 7.

Figure 7:
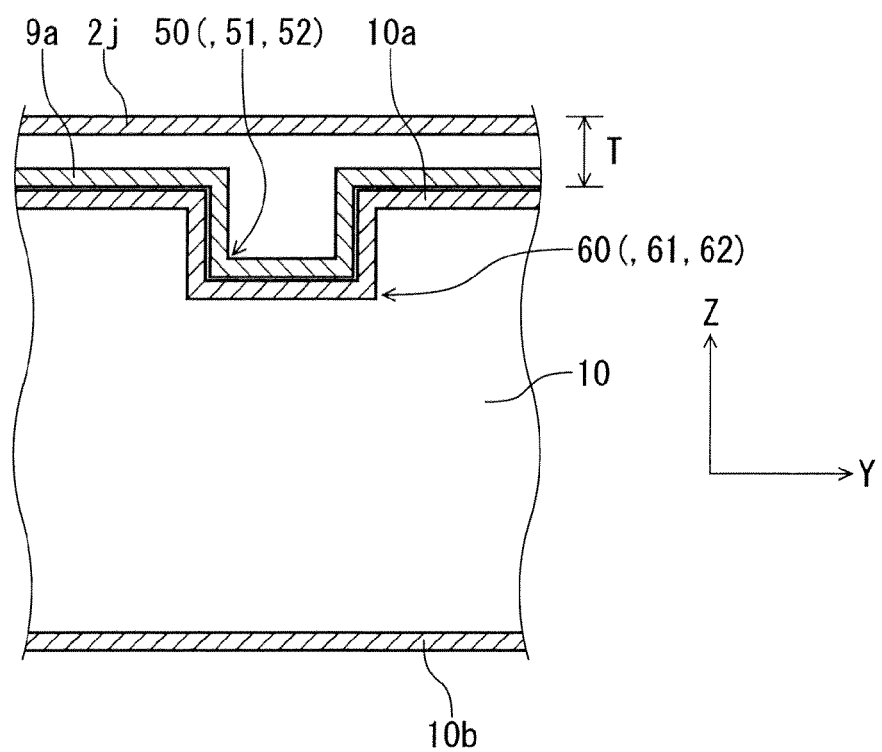
FIG. 7 is a partial sectional view taken by a plane that intersects a beam, extending in the X direction, of the main unit (and the slit extending in the X direction) in the state that the battery pack is housed in a battery holder.

FIG. 7 is a sectional view taken by a plane that intersects the beam 50, extending in the X direction, of the main unit 2 (and the slit 60) in the state that the battery pack 10 is housed in the battery holder 9.

As shown in the sectional view of FIG. 7, the top wall 9a of the battery holder 9 is formed under the ceiling wall 2j which is part of the case 2a. That portion of the case 2a which has the ceiling wall 2j and the top wall 9a has a thickness T. The ceiling wall 2j and the top wall 9a may constitute a single, integral member rather than are the two separate members. The top wall 9a is formed with the beam 50.

The top face 10a of the battery pack 10 is formed with the slit 60 which is fitted with the beam 50 in the state that the battery pack 10 is housed in the battery holder 9. As described above with reference to FIGS. 4-6, the spaces for accommodating the battery cells are secured between the top face 10a and the bottom face 10b.

In the state that the battery pack 10 is housed in the battery holder 9, the top wall 9a and the top face 10a are generally in close contact with each other without interfering with each other. The beam 50 is fitted in the slit 60. It is preferable that molding be performed so that the length (height), in the Z direction, of the beam 50 is equal to or shorter than the length (depth), in the Z direction, of the slit 60.

With the above structure, the case 2a of the main unit 2 can be made thinner in the Z direction in the region where the battery pack 10 is housed.

In the main unit 2, the structure that is found in a sectional view taken by a plane that intersects the beam 51 or 52 (slit 61 or 62) extending in the Y direction is approximately the same as the structure that is found in a sectional view taken by a plane that intersects the beam 50 (slit 60) extending in the X direction (see FIG. 7).

Figure 8:
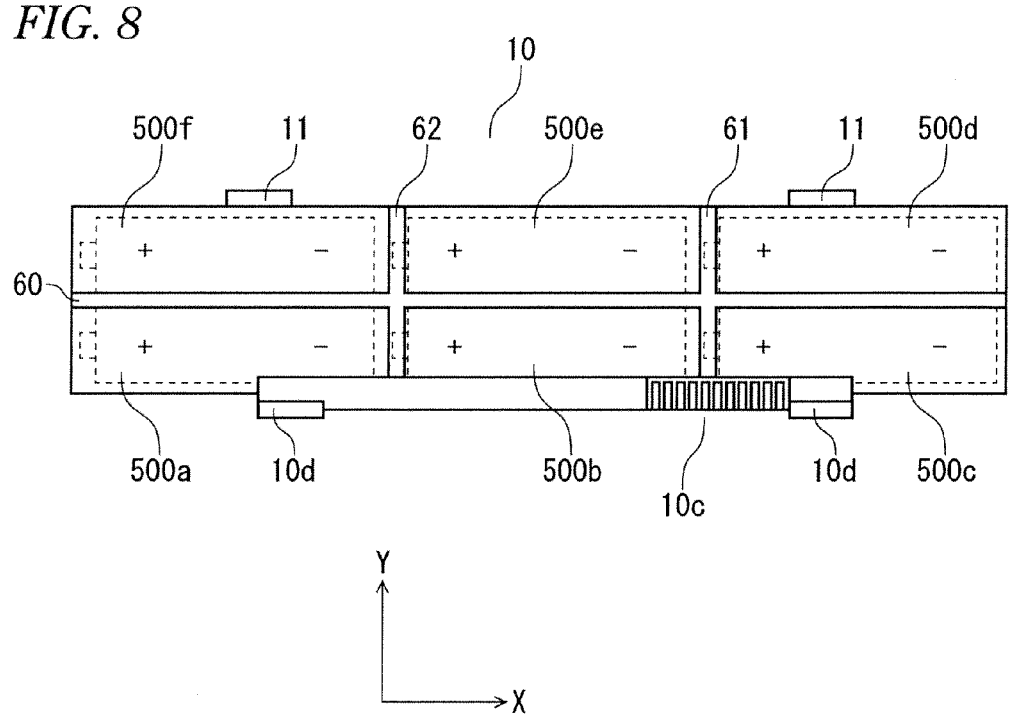
FIG. 8 is a top view of the battery pack.

Next, how the top face 10a of the battery pack 10 is formed with the slits 60-62 will be described with reference to FIG. 8. FIG. 8 is a top view of the battery pack 10.

In the embodiment, the battery pack 10 is provided with the two nails 10d and the one connector 10c on the front side and is provided with the two ribs 11 on the rear side. Six battery cells 500a-500f are incorporated in the battery pack 10. The battery cells 500a-500f are disposed so that their positive terminal sides and the negative terminal sides are arranged alternately in the X direction. Although each of the battery cells 500a-500f is oriented so that its negative terminal side and positive terminal side are located on the left side and the right side in the X direction, the invention may not be limited to such a case.

The slit 60 which extends in the X direction is formed between a front housing portion where the battery cells 500a-500c are housed and a rear housing portion where the battery cells 500d-500f are housed. The slit 60 is parallel with the longitudinal directions of the battery cells 500a-500f.

The slit 61 which extends in the Y direction is formed between a right housing portion where the battery cells 500c and 500d are housed and a middle housing portion where the battery cells 500b and 500e are housed. The slit 62 which extends in the Y direction is formed between the middle housing portion where the battery cells 500b and 500e are housed and a left housing portion where the battery cells 500a and 500f are housed. The slits 60 and 61 are formed parallel with the shorter-axis directions of the battery cells 500a-500f. The slits 60 and 61 are located over the positive terminals of the battery cells 500b-500e.

The slit 60 extending in the X direction intersects the slits 61 and 62 extending in the Y direction.

In other words, the battery cells 500a-500f of the battery pack 10 are arranged in the X direction and the Y direction. The slits 60-62 are formed on lines that are obtained in the top face 10a when the boundaries between the battery cells 500a-500f are projected in the Z direction onto the top face 10a. In particular, the slits 61 and 62 are formed so as to go along regions that are obtained in the top face 10a when the positive terminals (positive pole terminals) of the battery cells 500b-500e are projected in the Z direction onto the top face 10a.

The positions of the positive terminal side and the negative terminal side of each of the battery cells 500a-500f in the X direction may not be limited to those shown in FIG. 8.

Although in the embodiment the battery cells 500a-500f are cylindrical cells, the invention can also be applied to cases of using square-shaped cells or laminate cells.

As described above, in the embodiment, the top wall 9a (part of the case 2a) of the battery holder 9 which is provided in the notebook PC 1 is formed with the beams 50-52. Since the top wall 9a is increased in strength (reinforced) by the beams 50-52, that portion of the case 2a which is located over the battery holder 9 can be reduced in thickness. The top face 10 of the battery pack 10 which is housed in the battery holder 9 is formed with the slits 60-62 without any increase in the thickness of the top wall of the battery pack 10. The slits 60-62 are fitted with the respective beams 50-52 of the battery holder 9. Therefore, the notebook PC 1 is kept thin even in the state that the battery pack 10 is housed in the battery holder 9. In conclusion, the electronic apparatus can be made thinner while the strength of the case of the electronic apparatus main body is increased.

Although the embodiments according to the present invention have been described above, the present invention may not be limited to the above-mentioned embodiments but can be variously modified. Components disclosed in the aforementioned embodiments may be combined suitably to form various modifications. For example, some of all components disclosed in the embodiments may be removed or may be appropriately combined.

Additional advantages and modifications will readily occur to those skilled in the art. Therefore, the invention in its broader aspects may not be limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a battery pack that comprising a first battery cell and a second battery cell that are arranged in a first direction and store energy for enabling operation of electronic components; and
   a battery holder that houses the battery pack,
   wherein the battery holder comprises a projecting part in a first face that configures the battery holder and covers the battery pack;
   wherein the battery pack is provided with a slit that is fitted with the projecting part in a second face that is opposed to the first face;
   wherein the first direction intersects a boundary direction extending between the first battery cell and the second battery cell,
   wherein a longitudinal direction of the first and second battery cells is parallel to the boundary direction, and
   wherein a longitudinal direction of the slit is parallel to the first direction in the second face.

2. The electronic apparatus of claim 1,
   wherein the slit is formed so as to avoid interference with the first battery cell and the second battery cell.

3. The electronic apparatus of claim 1,
   wherein the first battery cell and the second battery cell have cylindrical shapes.

4. The electronic apparatus of claim 1, further comprising:
   a wall positioned between the first battery cell and the second battery cell and facing the projecting part inside the battery pack.

5. An electronic apparatus comprising:
   a battery pack that includes a first battery cell and a second battery cell and that has a slit that extends along an arrangement direction of the first battery cell and the second battery cell; and
   a case that comprises a face portion provided with an projecting part and that houses the battery pack at a position where the projecting part fits into the slit,
   wherein the arrangement direction intersects a boundary direction extending between the first battery cell and the second battery cell,
   wherein a longitudinal direction of the first and second battery cells is parallel to the boundary direction, and
   wherein a longitudinal direction of the slit is parallel to the arrangement direction.

6. The electronic apparatus of claim 5,
   wherein the slit is formed so as to avoid interference with the first battery cell and the second battery cell.

7. The electronic apparatus of claim 5,
   wherein the first battery cell and the second battery cell have cylindrical shapes.

8. The electronic apparatus of claim 5, further comprising:
   a wall positioned between the first battery cell and the second battery cell and facing the projecting part inside the battery pack.

9. An electronic apparatus comprising:
   a battery pack that includes a first battery cell and a second battery cell and is provided with a first slit that extends along a boundary between the first battery cell and the second battery cell in a first direction crossing an arrangement direction of the first battery cell and the second battery cell and a second slit extending in a second direction perpendicular to the first direction;
   a case that comprises a battery holder that houses the battery pack; and
   a projecting part that projects from a face of the battery holder to a side of the battery pack and is positioned within the second slit in a state where the battery pack is housed.

10. The electronic apparatus of claim 9, wherein the first slit is formed so as to avoid interference with the first battery cell and the second battery cell.

11. The electronic apparatus of claim 9, wherein the first slit is formed so as to pass through regions that are obtained in a face of the battery pack when positive pole terminals of the first battery cell and the second battery cell are projected in the direction crossing the arrangement direction, the face of the battery pack opposed to the face of the battery holder.

12. The electronic apparatus of claim 9, wherein the first battery cell and the second battery cell have cylindrical shapes.

13. The electronic apparatus of claim 9, further comprising a wall positioned between the first battery cell and the second battery cell and facing the projecting part inside the battery pack.

14. The electronic apparatus of claim 9, wherein the second slit extends in the arrangement direction of the first battery cell and the second battery cell is provided at a position crossing the first slit.

15. The electronic apparatus of claim 14, wherein the second slit is positioned along a boundary with the first battery cell and the second battery cell on one side of the boundary and a third battery cell positioned on another side of the boundary.

16. The electronic apparatus of claim 9 further comprising a second projecting part extending along the boundary between the first battery cell and the third battery cell.

* * * * *